(12) United States Patent
Chen et al.

(10) Patent No.: US 9,356,910 B2
(45) Date of Patent: *May 31, 2016

(54) APPLYING A PACKET ROUTING POLICY TO AN APPLICATION SESSION

(71) Applicant: A10 Networks, Inc., San Jose, CA (US)

(72) Inventors: Lee Chen, Saratoga, CA (US); Dennis Oshiba, Fremont, CA (US); John Chiong, San Jose, CA (US)

(73) Assignee: A10 Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/973,675

(22) Filed: Dec. 17, 2015

(65) Prior Publication Data

US 2016/0105395 A1    Apr. 14, 2016

Related U.S. Application Data

(63) Continuation of application No. 14/323,920, filed on Jul. 3, 2014, now Pat. No. 9,253,152, which is a continuation of application No. 14/061,722, filed on Oct. 23, 2013, now Pat. No. 8,826,372, which is a (Continued)

(51) Int. Cl.
*H04L 29/06* (2006.01)
*G06F 21/00* (2013.01)
*H04L 29/08* (2006.01)
*H04W 12/00* (2009.01)

(Continued)

(52) U.S. Cl.
CPC .......... *H04L 63/0236* (2013.01); *H04L 63/029* (2013.01); *G06F 21/00* (2013.01); *H04L 51/04* (2013.01); *H04L 63/02* (2013.01); *H04L 63/0407* (2013.01); *H04L 63/20* (2013.01); *H04L 65/1026* (2013.01); *H04L 67/10* (2013.01); *H04L 67/22* (2013.01); *H04L 67/306* (2013.01); *H04L 67/42* (2013.01); *H04M 1/72547* (2013.01); *H04W 12/00* (2013.01)

(58) Field of Classification Search
CPC ....... H04L 63/20; H04L 67/22; H04L 67/306; H04L 51/04; H04L 67/10; H04L 63/02; H04L 65/1026; H04L 63/0407; H04L 67/42; H04W 12/00; H04M 1/72547; G06F 21/00
See application file for complete search history.

(56) References Cited

U.S. PATENT DOCUMENTS 7,970,934 B1 * 6/2011 Patel ..................... H04L 41/147
                                                                709/244
8,191,106 B2 * 5/2012 Choyi ..................... H04L 63/20
                                                                713/150

(Continued)

*Primary Examiner* — Carl Colin
*Assistant Examiner* — Gary Lavelle
(74) *Attorney, Agent, or Firm* — Carr & Ferrell LLP

(57) ABSTRACT

A security gateway includes packet routing policies, each including a host network address, an application network address, and a forwarding interface. In routing data packets of an application session, the security gateway: recognizes the application session between a network and an application; determines a user identity from an application session record for the application session; determines packet routing policies applicable to the application session based on the user identity; receives a data packet for the application session, including a source network address and a destination network address; compares the source network address with the host network address, and the destination network address with the application network address; and in response to finding a match between the source network address and the host network address, and between the destination network address and the application network address, processes the data packet using the forwarding interface of the packet routing policy.

24 Claims, 13 Drawing Sheets

Related U.S. Application Data continuation of application No. 13/716,124, filed on Dec. 15, 2012, now Pat. No. 8,584,199, which is a continuation-in-part of application No. 13/650,179, filed on Oct. 12, 2012, now Pat. No. 8,595,791, which is a continuation of application No. 12/788,339, filed on May 27, 2010, now Pat. No. 8,312,507, which is a continuation-in-part of application No. 12/771,491, filed on Apr. 30, 2010, now Pat. No. 7,979,585, which is a continuation of application No. 11/582,613, filed on Oct. 17, 2006, now Pat. No. 7,716,378.

(51) Int. Cl.
*H04M 1/725* (2006.01)
*H04L 12/58* (2006.01)

(56) References Cited

U.S. PATENT DOCUMENTS

| | | | | |
|---|---|---|---|---|
| 2005/0009520 | A1* | 1/2005 | Herrero | H04L 29/12188 455/435.1 |
| 2005/0125276 | A1* | 6/2005 | Rusu | G06Q 30/02 705/304 |
| 2006/0077926 | A1* | 4/2006 | Rune | H04L 45/34 370/328 |
| 2007/0259673 | A1* | 11/2007 | Willars | H04W 52/0225 455/453 |
| 2007/0294209 | A1* | 12/2007 | Strub | H04L 63/102 |
| 2008/0109870 | A1* | 5/2008 | Sherlock | H04L 63/1425 726/1 |

* cited by examiner

```
Network Traffic Policy 451

Network based Application Session Access Control
Session Connection Rate Control
Traffic Shaping Control
Bandwidth Rate Capacity
Quality of Service or DSCP Marking Control
Packet Forwarding Control
Link Interface Preference
Server Load Balancing Preference
Application Session Modification Control
```

FIG. 8

APPLYING A PACKET ROUTING POLICY TO AN APPLICATION SESSION

CROSS-REFERENCE TO RELATED APPLICATIONS

The present application is a continuation and claims the priority benefit of U.S. patent application Ser. No. 14/323,920, filed on Jul. 3, 2014, issued as U.S. Pat. No. 9,253,152 on Feb. 2, 2016; which in turn is a continuation U.S. patent application Ser. No. 14/061,722, filed on Oct. 23, 2013, issued as U.S. Pat. No. 8,826,372 on Sep. 2, 2014; which in turn is a continuation of U.S. patent application Ser. No. 13/716,124, filed on Dec. 15, 2012, issued as U.S. Pat. No. 8,584,199 on Nov. 12, 2013; which in turn is a continuation-in-part of U.S. patent application Ser. No. 13/650,179, filed on Oct. 12, 2012, issued as U.S. Pat. No. 8,595,791 on Nov. 26, 2013; which in turn is a continuation of U.S. patent application Ser. No. 12/788,339, filed on May 27, 2010, issued as U.S. Pat. No. 8,312,507 on Nov. 13, 2012; which in turn is a continuation-in-part of U.S. patent application Ser. No. 12/771,491, filed on Apr. 30, 2010, issued as U.S. Pat. No. 7,979,585 on Jul. 12, 2011; which in turn is a continuation of U.S. patent application Ser. No. 11/582,613, filed on Oct. 17, 2006, issued as U.S. Pat. No. 7,716,378, on May 11, 2010. The disclosures of the above referenced applications are hereby incorporated by reference.

BACKGROUND OF THE INVENTION

1. Field

This invention relates generally to data networking, and more specifically, to a system and method to apply a packet routing policy based on a user identity during an application session.

2. Related Art

The secure data network of a company is a critical component for day-to-day functioning of company business activities. Company employees access the secure data network for communication within the company and with the outside world. Company information, oftentimes proprietary or confidential, is exchanged during the communication.

Typically, an employee gains access to the company's secure data network by means of a network logon procedure using a private user identity, such as a user name "Robert P. Williamson" or an employee number "NG01-60410". Subsequent information exchange using the company's office applications, such as email, file transfer or document control is traceable based on the private user identity through network event logs.

Since the late 1990's, we have been witnessing the phenomenal rising popularity of public communication applications and services, such as email and Instant Messaging offered by Yahoo™, America Online™ (AOL), or Google™, conferencing and collaboration services offered by WebEx™ or Centra™, or peer-to-peer services for a variety of file sharing. Generally, a public communication service allows a user to exchange information through messaging, text chat or document exchange using a public user identity, such as "butterdragon", "fingernail1984", or "peterrabbit".

However, in a company setting, when an employee connects to a public communication service with a public user identity over the company's secure data network, the information exchange is not easily traceable if at all since the public user identity is not tied to the private user identity.

In one example, a company's information technology (IT) department notices that an employee Victor has been using the company's email system to send out proprietary documents, violating the company's security policy. After issuing a warning to Victor, the IT department finds no further violations. Unfortunately, they are not aware of the fact that Victor has continued this activity using Yahoo™ email with a public user identity "PiratesOfCaribbean@Yahoo.com".

In another example, two weeks before a major trade show, a company implements a security measure to monitor communication activities of employees of director level and above to ensure confidentiality of competitive information. This security measure, covering company email, phone conversation and voice messaging, nevertheless proves to be a failure as sensitive information leaks out to a business reporter anyway prior to the trade show. The source of the leak may never be confirmed, but the business reporter privately discloses that he gets the information from an anonymous employee of the company using AOL Instant Messaging™ with screen name "opensecret2006".

In addition to associating a user identity to an application session, the company often desires to handle the network traffic of the associated application session in a control or isolated manner.

The above discussion illustrates a need for a security driven packet forwarding solution to associate a user identity to an application.

BRIEF SUMMARY OF THE INVENTION

According to some embodiments of the present invention, a method for routing data packets of an application session, comprises: recognizing the application session between a network and an application via a security gateway; determining by the security gateway a user identity from an application session record for the application session, wherein the application session record comprises a user identity used for accessing a network through a host, a host identity for the host, and an application session time, wherein a creating of the application session record comprises: querying an identity server by sending the host identity and the application session time in the application session record, wherein the identity server comprises an access session record for an access session between a second host and the network, wherein the access session record comprises a second user identity used for accessing the network through the second host, a second host identity for the second host, and an access session time, wherein the identity server compares the host identity in the application session record with the second host identity in the access session record, and comparing the access session time with the application session time, wherein the identity server returns the second user identity in the access session record, if the host identity in the application session record matches the second host identity in the access session record, and if the access session time matches the application session time; and storing the second user identity as a network user identity used for accessing the network in the application session record; determining one or more packet routing policies applicable to the application session based on the user identity, each packet routing policy comprising a host network address, an application network address, and a forwarding interface; receiving a data packet for the application session by the security gateway, the data packet comprising a source network address and a destination network address; comparing, by the security gateway, the source network address from the data packet with the host network address of each packet routing policy, and comparing the destination network address from the data packet with the application network address of each packet routing policy; and in response to finding a match between the source network address and the host network address of a given packet routing policy, and between the destination network address and the application network address of the given packet routing policy, processing the data packet using the forwarding interface of the given packet routing policy by the security gateway.

In one aspect of the present invention, the security gateway comprises a network interface, wherein the forwarding interface of the given packet routing policy indicates transmission of data packets using the network interface, wherein the processing further comprises: in response to finding the match between the source network address and the host network address of the given packet routing policy, and between the destination network address and the application network address of the given packet routing policy, transmitting the data packet using the network interface of the security gateway.

In one aspect of the present invention, the security gateway is coupled to a network element, wherein the forwarding interface of the given packet routing policy directs the security gateway to send data packets to the network element, wherein the processing further comprises: in response to finding the match between the source network address and the host network address of the given packet routing policy, and between the destination network address and the application network address of the give packet routing policy, transmitting the data packet to the network element using the network interface of the security gateway.

In one aspect of the present invention, the one or more packet routing policies comprise a second given packet routing policy associated with the network element, the second given packet routing policy comprising a second host network address, a second application network address, and a second forwarding interface, wherein the determining the one or more packet routing policies further comprises: determining by the security gateway that the second given packet routing policy is associated with the network element; and in response to determining that the second given packet routing policy is associated with the network element, sending the second given packet routing policy to the network element by the security gateway.

In one aspect of the present invention, the forwarding interface of the given packet routing policy indicates transmission of data packets to the network element, wherein the processing further comprises: in response to finding the match between the source network address and the host network address of the given packet routing policy, and between the destination network address and the application network address of the given packet routing policy, transmitting the data packet to the network element by the security gateway.

In one aspect of the present invention, the method further comprises: receiving the data packet from the security gateway by the network element; comparing, by the network element, the source network address from the data packet with the second host network address of the second given packet routing policy, and comparing the destination network address from the data packet with the second application network address of the second given packet routing policy; and in response to finding a match between the source network address and the second host network address, and between the destination network address and the second application network address, processing the data packet using the second forwarding interface of the second given packet routing policy by the network element.

In one aspect of the present invention, the method further comprises: generating a security report based on the application session record and the one or more packet routing policies.

System and computer program products corresponding to the above-summarized methods are also described and claimed herein.

BRIEF DESCRIPTION OF THE DRAWINGS

FIG. 8 illustrates a plurality of embodiments of network traffic policy according to an embodiment of the present invention.

DETAILED DESCRIPTION OF THE INVENTION

Figure 1A:
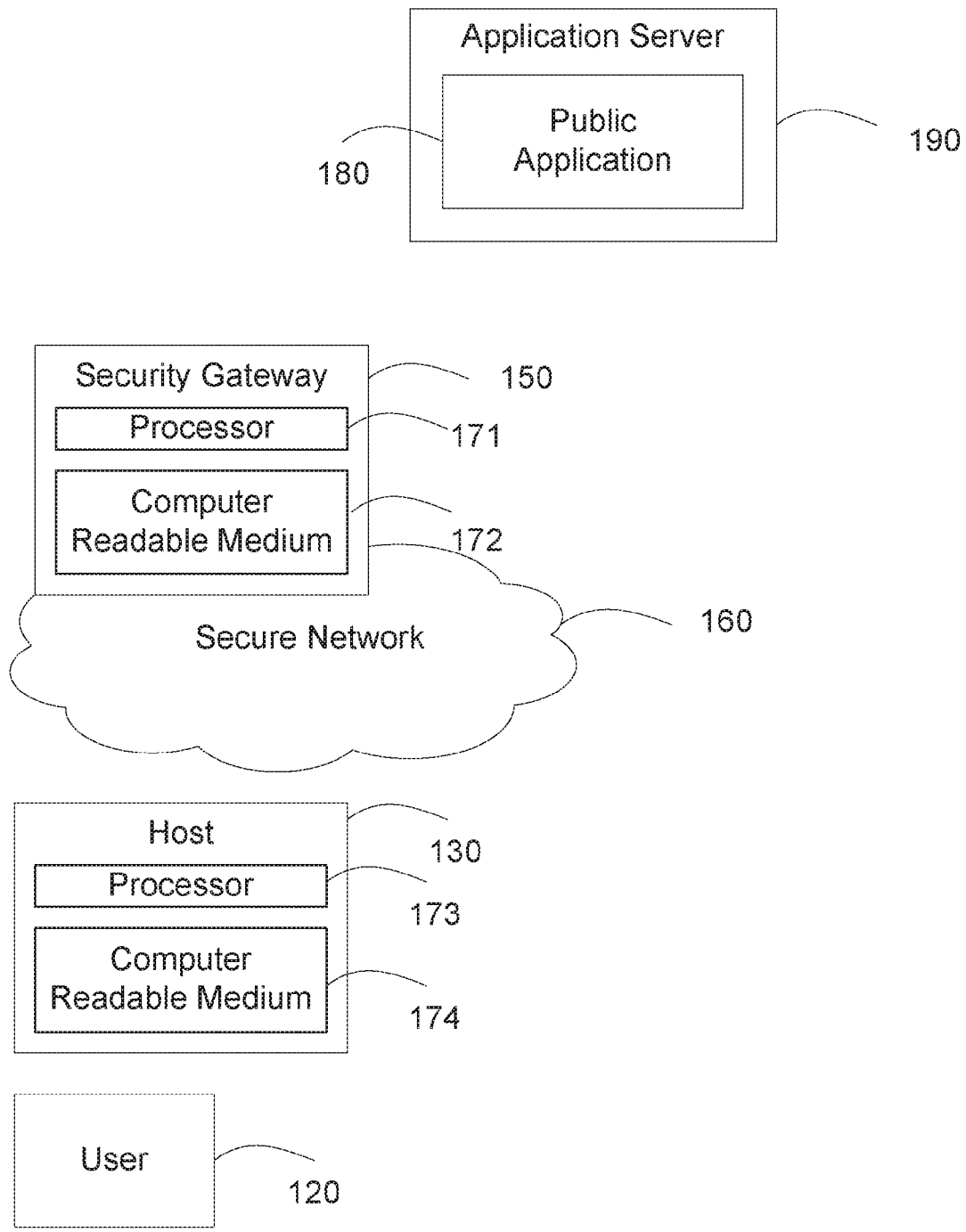
FIG. 1A illustrates a secure network according to an embodiment of the present invention.

FIG. 1A illustrates a secure network according to an embodiment of the present invention.

A secure network 160 includes a host 130. User 120 uses host 130 to access a public application 180 hosted in application server 190. Application server 190 is outside of secure network 160. The network traffic between host 130 and application server 190 passes through security gateway 150. The security gateway 150 is operationally coupled to a processor 171 and a computer readable medium 172. The computer readable medium 172 stores computer readable program code for implementing the various embodiments of the present invention as described herein.

Host 130 is a computing device with network access capabilities. The host 130 is operationally coupled to a processor 173 and a computer readable medium 174. The computer readable medium 174 stores computer readable program code for implementing the various embodiments of the present invention as described herein. In some embodiments, host 130 is a workstation, a desktop personal computer or a laptop personal computer. In some embodiments, host 130 is a Personal Data Assistant (PDA), a smartphone, or a cellular phone.

In some embodiments, secure network 160 is an Internet Protocol (IP) network. In some embodiments, secure network 160 is a corporate data network or a regional corporate data network. In some embodiments, secure network 160 is an Internet service provider network. In some embodiments, secure network 160 is a residential data network. In some embodiments, secure network 160 includes a wired network such as Ethernet. In some embodiments, secure network 160 includes a wireless network such as a WiFi network.

Public application 180 provides a service that allows user 120 to communicate with other users in a real-time fashion. In some embodiments, the service includes text chat. In some embodiments, the service includes a voice call or a video call. In some embodiments, the service includes a network game. In some embodiments, the service includes exchanging a document, such as sending or receiving a text document, a PowerPoint™ presentation, an Excel™ spreadsheet, an image file, a music file or a video clip. In some embodiments, the service includes a collaborative document processing such as creating a document, a business plan, an agreement, wherein user 120 collaborates with other users in a real time fashion. In some embodiments, the service includes a collaborative information exchange such as a conference call. In some embodiments, the service is a social networking service. In some embodiments, the service includes real-time collaboration and non real-time collaboration.

In one example, public application 180 provides America Online Instant Messenger™ service. In one example, public application 180 provides Yahoo Instant Messenger™ voice service. In some embodiments, public application 180 provides a file sharing service such as Kazaa™ file sharing service. In some embodiments, public application 180 provides a network game service such as Microsoft™ Network Game service. In some embodiments, public application 180 provides an on-line collaborative document processing such as Google Docs™, and Salesforce.com™. In some embodiments, public application 180 provides an on-line information exchange and communications such as WebEx™. In some embodiments, public application 180 provides live information streaming such as live video streaming, live audio streaming, and instantaneous picture uploading.

Security gateway 150 is situated at the edge of secure network 160. Security gateway 150 connects secure network 160 to public application 180. Security gateway 150 receives network traffic from secure network 160 and transmits the network traffic to application server 190. Likewise, security gateway 150 receives network traffic from application server 190 and transmits the network traffic to secure network 160.

In some embodiments, security gateway 150 includes the function of a corporate Wide Area Network (WAN) gateway. In some embodiments, security gateway 150 includes the function of a residential broadband gateway. In some embodiments, security gateway 150 includes the function of a WAN gateway for an Internet service provider.

Figure 1B:
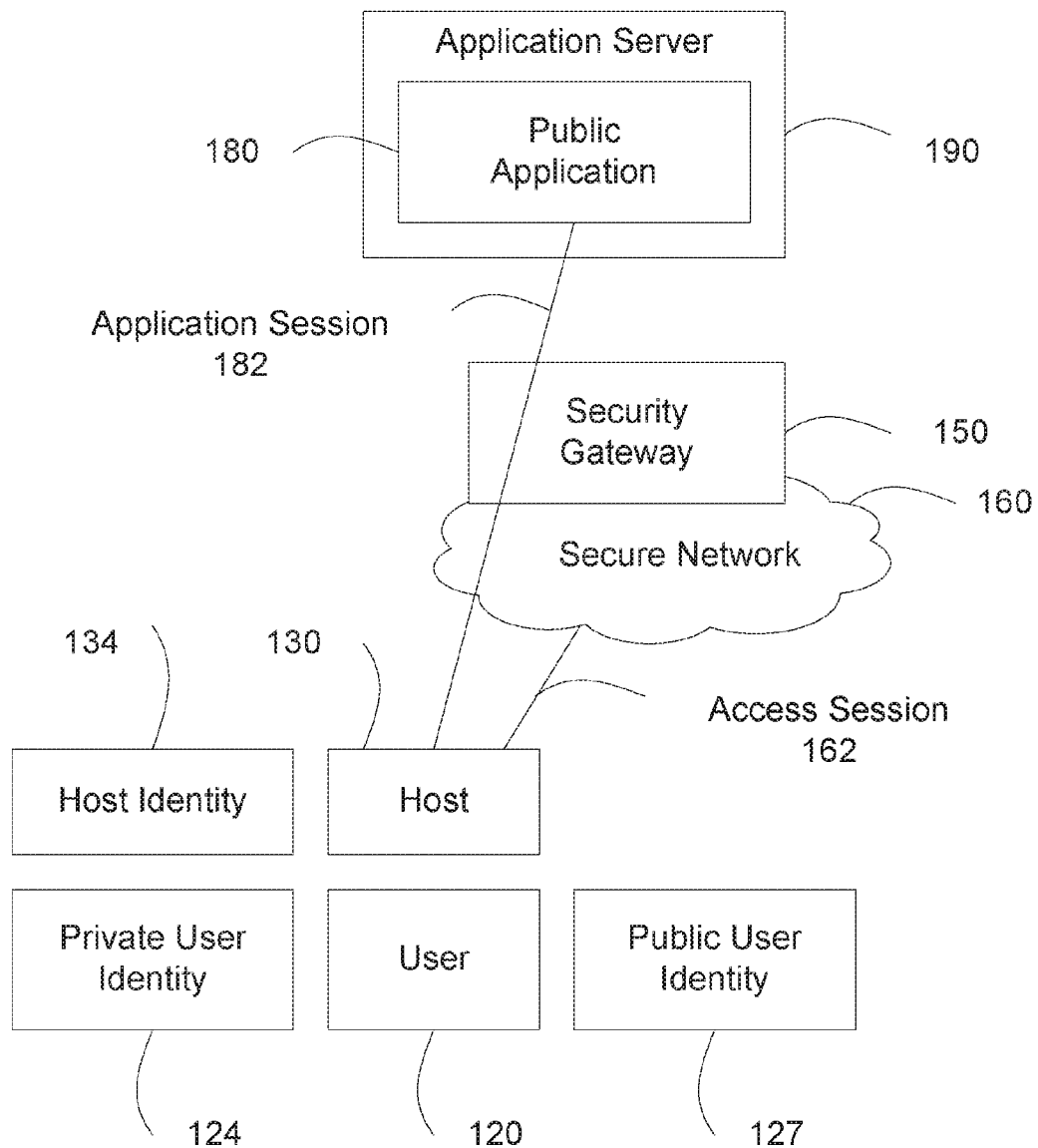
FIG. 1B illustrates an access session and an application session according to an embodiment of the present invention.

FIG. 1B illustrates an access session and an application session according to an embodiment of the present invention.

User 120 uses host 130 to access secure network 160 during an access session 162.

Host 130 has a host identity 134. Host 130 uses host identity 134 to connect to secure network 160. In some embodiments, host identity 134 includes an Internet Protocol (IP) address. In some embodiments, host identity 134 includes a Media Access Control (MAC) address.

Within secure network 160, user 120 has a private user identity 124. In some embodiments, private user identity 124 is an employee number or an employee name. In some embodiments, private user identity 124 is an Internet service subscription identity. In some embodiments, access session 162 is established after a successful network user log-in procedure, such as an employee network log-in, for secure network 160 using private user identity 124. Private user identity 124 is associated with host identity 134. In some embodiments, host 130 is a guest computing device. Private user identity 124 is associated with an Ethernet switch port where host 130 connects. In this embodiment, private user identity 124 is a port number, an Ethernet interface identity, or an Ethernet VLAN identity.

User 120 uses host 130 to access public application 180 in an application session 182. User 120 uses a public user identity 127 during application session 182. In some embodiments, public application 180 prompts user 120 to log-in before establishing application session 182. During the application user log-in procedure, user 120 provides to public application 180 public user identity 127. In another embodiment, public application 180 selects a public user identity 127 for user 120 for application session 182. In some embodiments, public user identity 127 is set up through a user registration process or a service subscription process. Network traffic in application session 182 passes through security gateway 150.

Figure 1C:
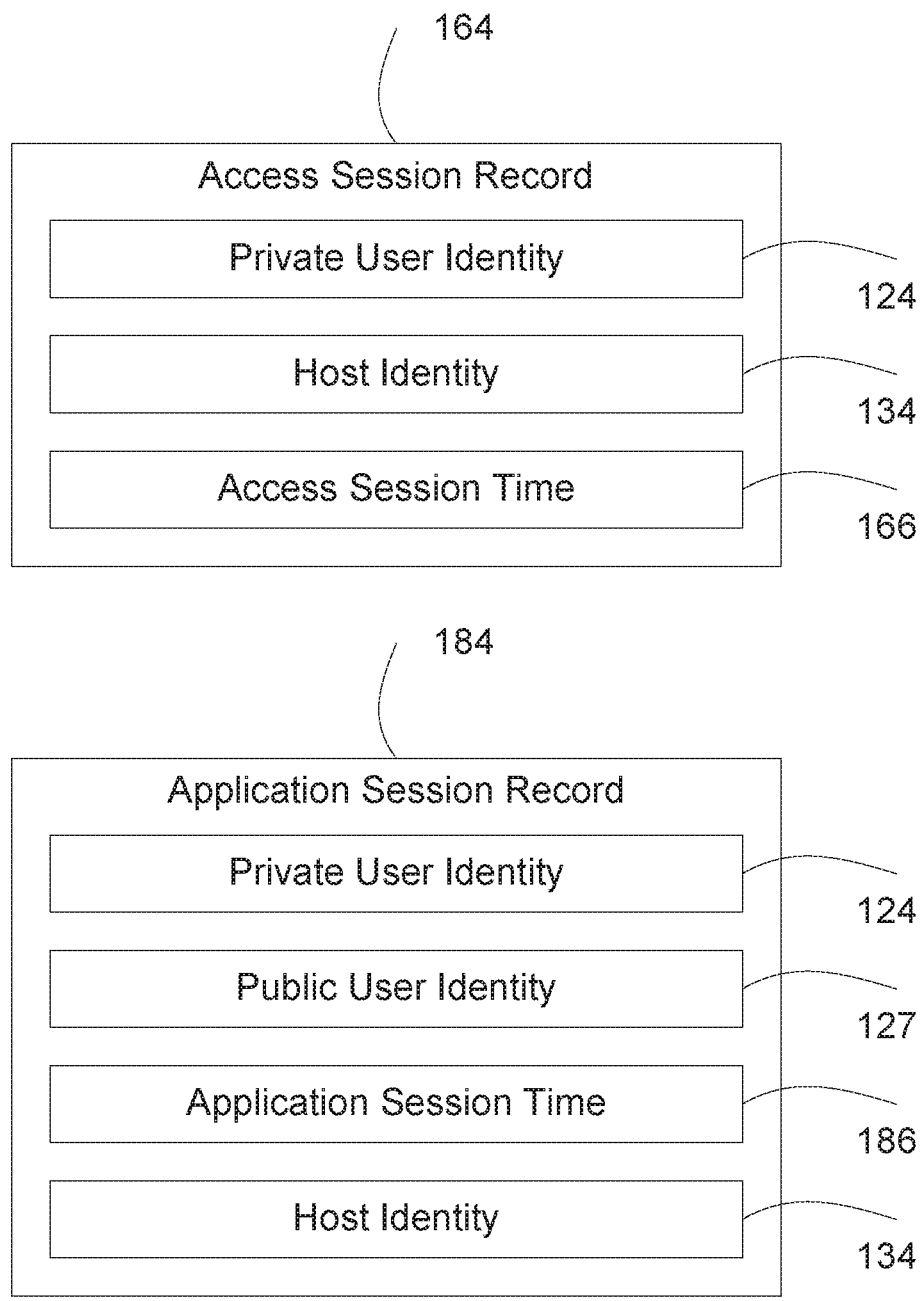
FIG. 1C illustrates an access session record and an application session record according to an embodiment of the present invention.

FIG. 1C illustrates an access session record and an application session record according to an embodiment of the present invention.

Access session record 164 records information about access session 162. The information includes private user identity 124, host identity 134 and access session time 166. In some embodiments, access session time 166 is the starting time when access session 162 is established. In some embodiments, access session time 166 includes the starting time and the ending time when user 120 finishes access session 162. In some embodiments, access session time 166 is a time stamp for a time during access session 162.

Application session record 184 records information about application session 182. The information includes private user identity 124, public user identity 127, and application session time 186. In some embodiments, the information further includes host identity 134. In some embodiments, application session time 186 includes the starting time when application session 182 is established. In some embodiments, application session time 186 includes a time stamp during application session 182. In some embodiments, application session time 186 includes a time stamp when security gateway 150 recognizes application session 182.

Figure 2:
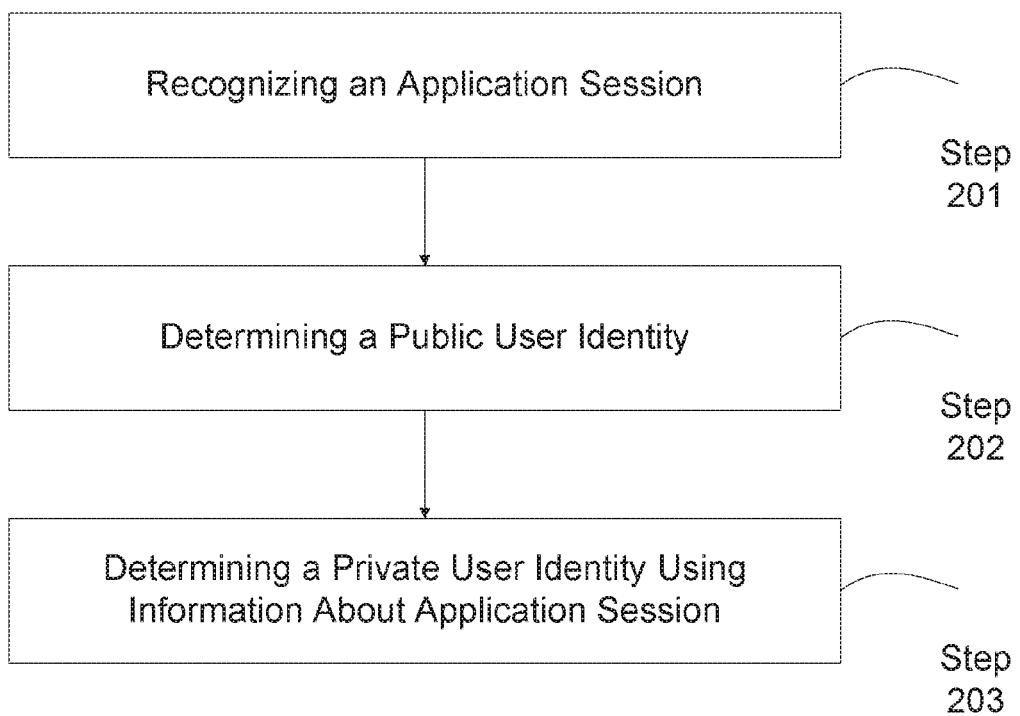
FIG. 2 illustrates a process to generate an application session record according to an embodiment of the present invention.

FIG. 2 illustrates a process to generate an application session record according to an embodiment of the present invention.

The process of generating application session record 184 includes multiple steps.

In step 201, security gateway 150 recognizes an application session.

In step 202, security gateway 150 determines a public user identity of the application session.

In step 203, security gateway 150 determines a private user identity using information about the application session.

Figure 3:
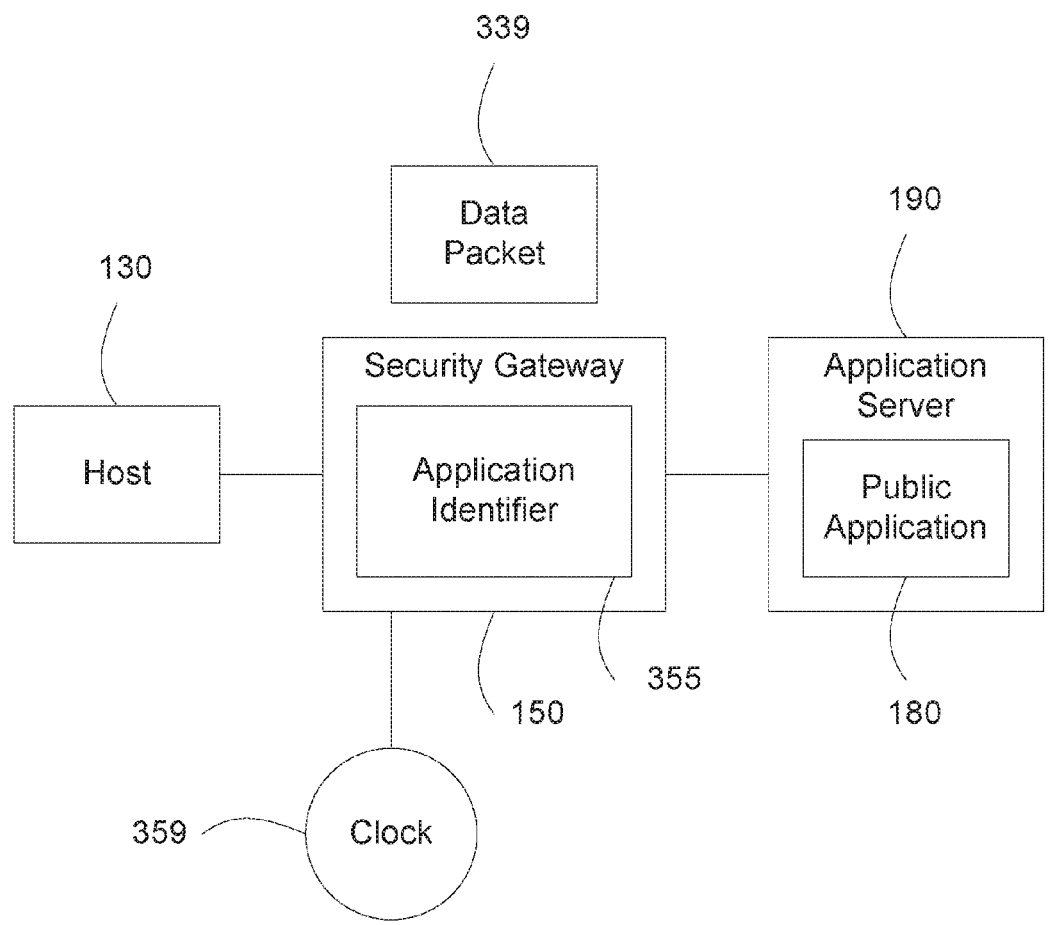
FIG. 3 illustrates a process to recognize an application session according to an embodiment of the present invention.
Figure 4A:
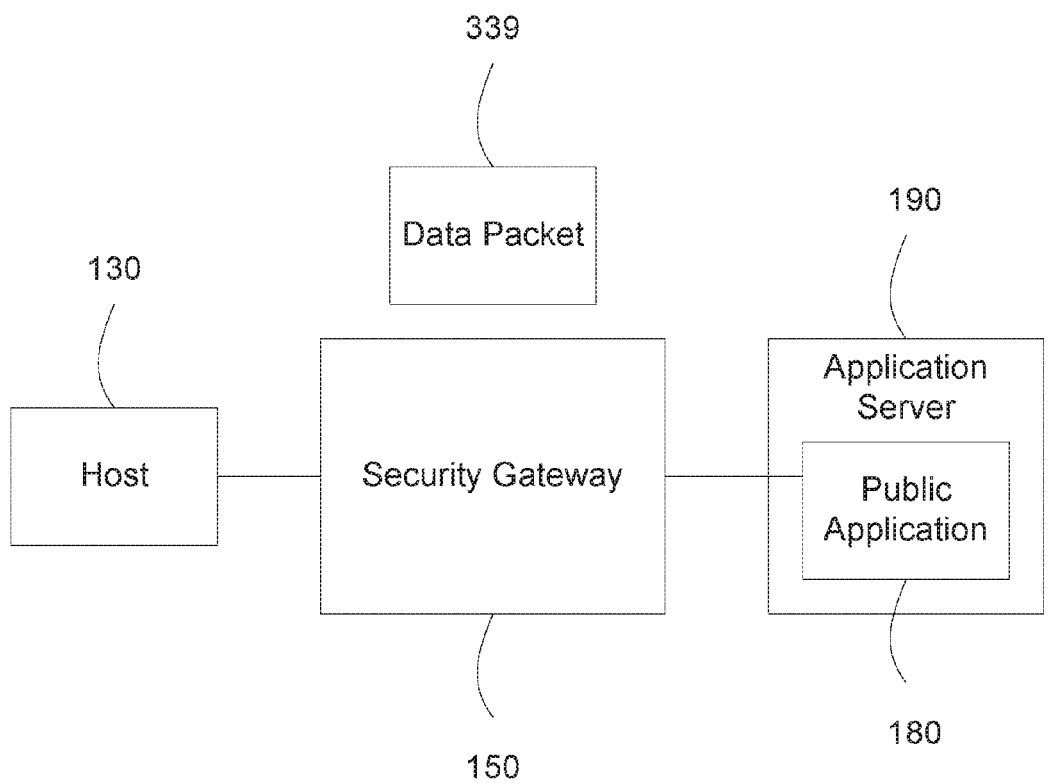
FIG. 4A illustrates a process to determine a public user identity of application session according to an embodiment of the present invention.
Figure 4B:
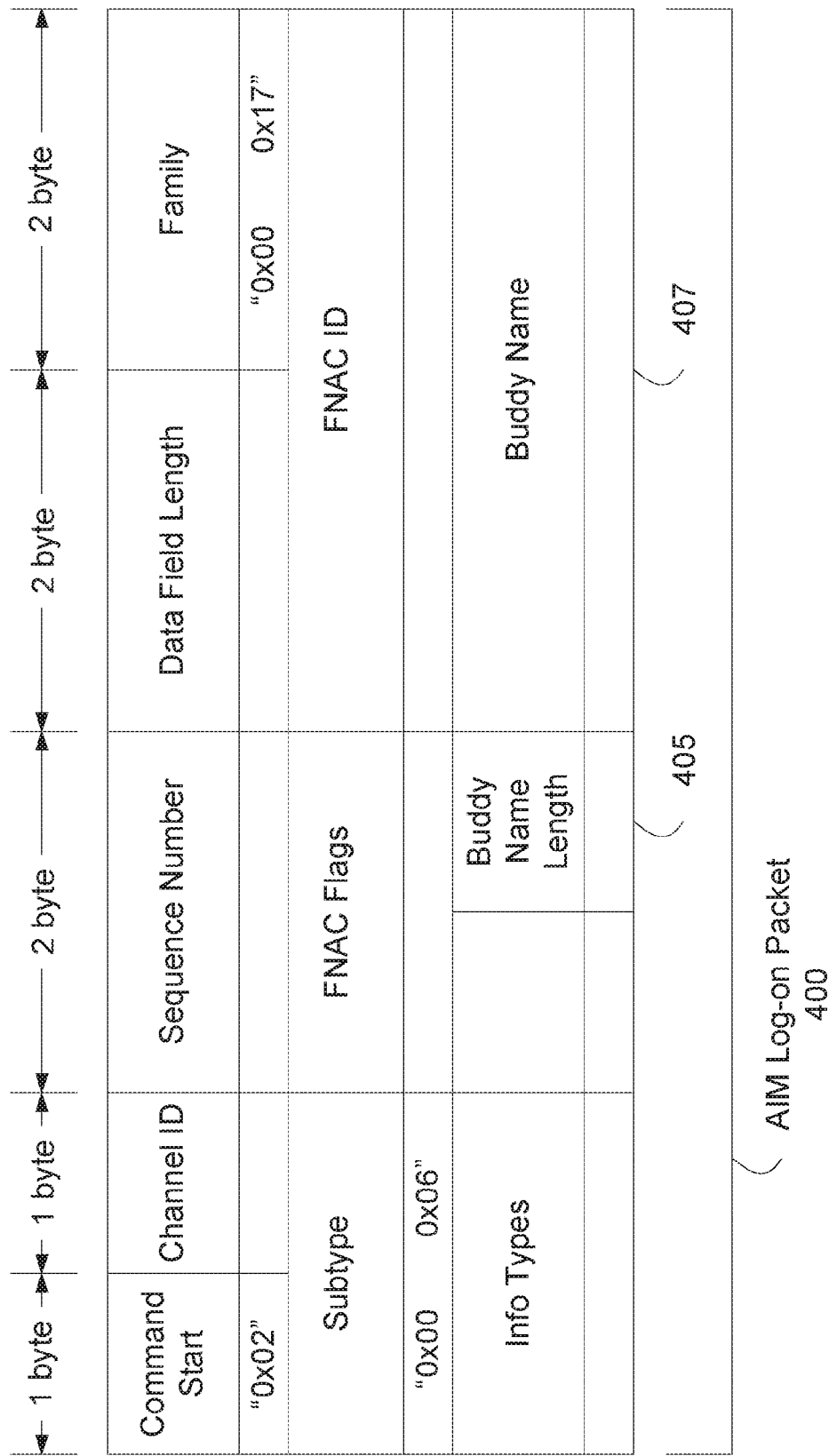
FIG. 4B illustrates a data packet in an AIM log-on packet according to an embodiment of the present invention.
Figure 5:
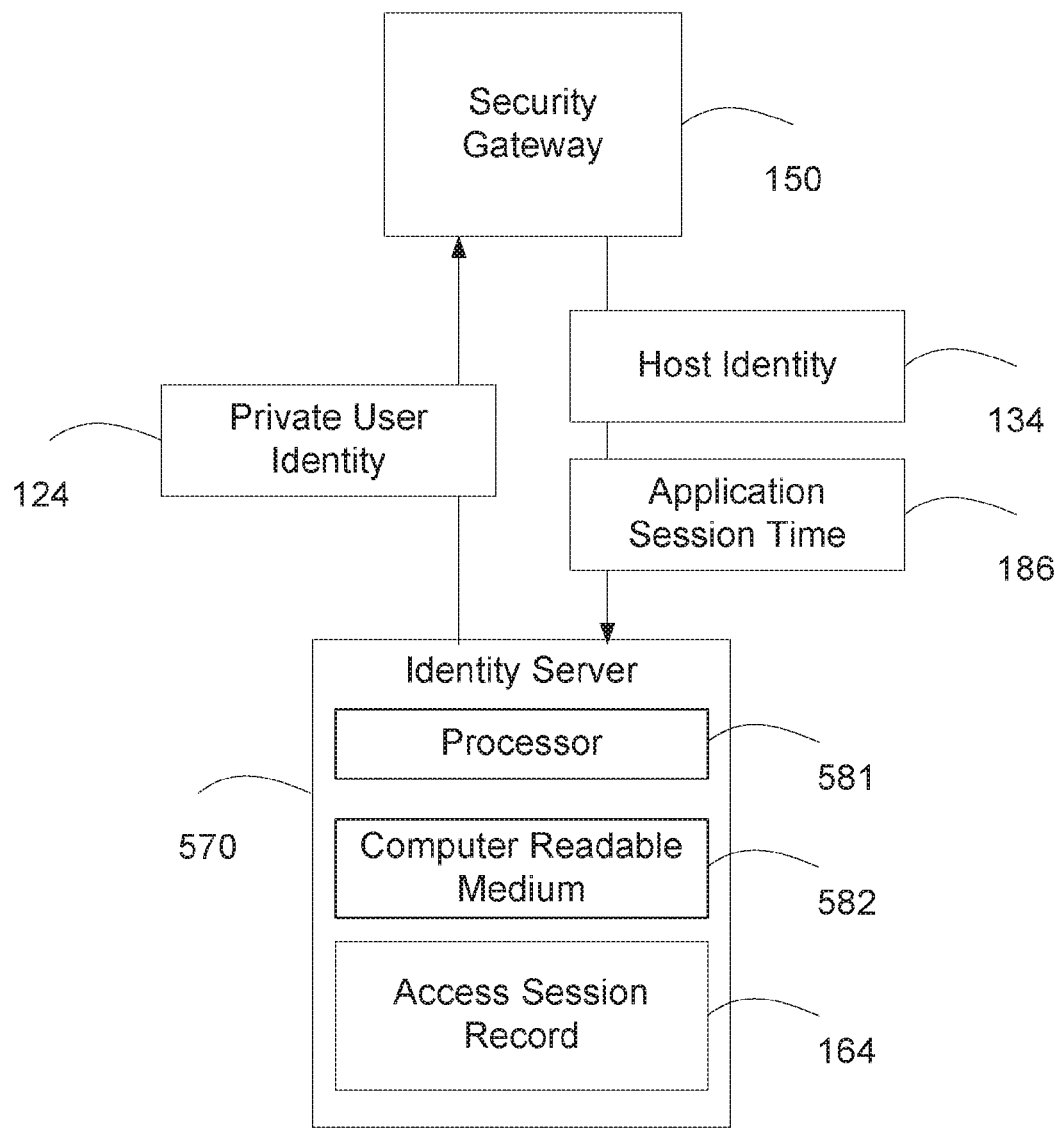
FIG. 5 illustrates a process to determine a private user identity according to an embodiment of the present invention.

FIGS. 3-5 illustrates steps 201-203 respectively.

FIG. 3 illustrates a process to recognize an application session according to an embodiment of the present invention.

Security gateway 150 inspects network traffic between host 130 and application server 190 to recognize application session 182 for public application 180.

In some embodiments, security gateway 150 inspects data packet 339 between host 130 and application server 190 for the recognition of application session 182.

Security gateway 150 includes an application identifier 355 for public application 180. Application identifier 355 includes information for recognizing application session 182. In some embodiments, application identifier 355 includes a transport layer information, such as Transmission Control Protocol (TCP) or User Diagram Protocol (UDP); and at least one transport port number, such as a TCP port number or a UDP port number. In some embodiments, application identifier 355 includes application layer information, such as one or more data filters wherein a data filter specifies a value and a position of the value in a data packet. In one example, a data filter is [byte 0 with value "0x52"]. In one example, a data filter is [byte 4-7 with ASCII value of "ADER"].

Security gateway 150 matches data packet 339 against application identifier 355.

In some embodiments, application identifier 355 includes transport protocol type of TCP and a destination TCP port number of 5190, the TCP port number used by AIM protocol. In this embodiment, data packet 339 is a TCP packet from host 130 to application server 190. Security gateway 150 matches data packet 339 against application identifier 355 and determines that public application 180 provides AIM service.

Security gateway 150 creates application session record 184. Security gateway 150 extracts the source IP address from the IP header of data packet 339 and stores the source IP address as host identity 134. In some embodiments, data packet 339 includes link layer information, such as a source MAC address; security gateway 150 extracts and stores the source MAC address as host identity 134.

In some embodiments, security gateway 150 connects to a clock 359. Clock 359 indicates the current time of day. Security gateway 150 stores the time of day indicated by clock 359 in application session time 186.

FIG. 4A illustrates a process to determine a public user identity of application session 182 according to an embodiment of the present invention.

The method for determining public user identity 127 is typically specific to public application 180. In some embodiments, data packet 339 is an application packet. For example, public application 180 provides AIM service; data packet 339 is an AIM packet.

An AIM packet includes multiple fields, for example Command start field is a 1-byte data field starting at byte offset 0 having a fixed hexadecimal value "0x02";

Channel ID field is a 1-byte data field starting at byte offset 1;

Sequence number field is a 2-byte integer starting at byte offset 2;

Data field length field is a 2-byte data field starting at byte offset 4;

Family field is a 2-byte data field starting at byte offset 6; and

Subtype field is a 2-byte data field starting at byte offset 8.

An AIM log-on packet is a AIM packet with family field having a fixed hexadecimal value of "0x00 0x17" and subtype field having a fixed hexadecimal value of "0x00 0x06".

AIM log-on packet further includes buddy name length field, a 1-byte integer starting at byte offset 19, and a variable length buddy name field starting at byte offset 20. Buddy name length field indicates the length in bytes of buddy name field.

Security gateway 150 matches data packet 339 to determine if data packet 339 is an AIM log-on packet. In some embodiments, data packet 339 is an AIM log-on packet 400 illustrated in FIG. 4B. Security gateway 150 extracts buddy name length field 405. Security gateway 150 further extracts buddy name field 407. In this embodiment, buddy name length field 405 is integer "13" and buddy name field 407 is "JohnSmith1984". Security gateway 150 stores "JohnSmith1984" as public user identity 127 in application session record 184.

In some embodiments, data packet 339 is not an AIM log-on packet. Security gateway 150 inspects another data packet from host 130.

FIG. 5 illustrates a process to determine a private user identity according to an embodiment of the present invention.

Secure network 160 includes an identity server 570. The identity server 570 is operationally coupled to a processor 581 and a computer readable medium 582. The computer readable medium 582 stores computer readable program code for implementing the various embodiments of the present invention as described herein. Identity server 570 includes access session record 164 of access session 162 during which user 120 accesses application session 182.

Security gateway 150 queries identity server 570. Security gateway 150 sends host identity 134 and application session time 186 to identity server 570.

Identity server 570 receives host identity 134 and application session time 186. Identity server 570 matches host identity 134 and application session time 186 against access session record 164. Identity server 570 determines that host identity 134 matches host identity of access session record 164. Identity server 570 further determines that application session time 186 matches access session time 166 of access session record 164 as application session time 186 is between the starting time and the ending time of access session record 164. Identity server 570 sends private user identity 124 of access session record 164 to security gateway 150 as a response to the query.

Security gateway 150 receives private user identity 124 from identity server 570, and stores private user identity 124 in application session record 184.

In some embodiments, security gateway 150 stores public user identity 127 in application session record 184 after recognizing a log-on approval indication for the public user identity 127 from public application 180.

In some embodiments, security gateway 150 queries identity server 570 immediately after determining public user identity 127. In some embodiments, security gateway 150 queries identity server 570 after application session 182 ends.

In some embodiments, security gateway 150 queries identity server 570 by sending a plurality of host identities in a bulk request; and receives a plurality of private user identities in a bulk response.

In some embodiments, application session record 184 includes additional user information associated with private user identity 124, such as cubicle or office number, cubicle or office location, telephone number, email address, mail-drop location, department name/identity, or manager name.

In some embodiments, security gateway 150 obtains the additional user information from identity server 570. In some embodiments, security gateway 150 obtains the additional user information by querying a different server, such as a corporate directory server, by using the private user identity 124 received from identity server 570.

In some embodiments, public application 180 provides file transfer service using File Transfer Protocol (FTP) protocol or a proprietary protocol. In some embodiments, public application 180 provides email service using Simple Mail Transfer Protocol (SMTP), Internet Message Access Protocol (IMAP) or Post Office Protocol version 3 (POP3) protocol.

Figure 6:
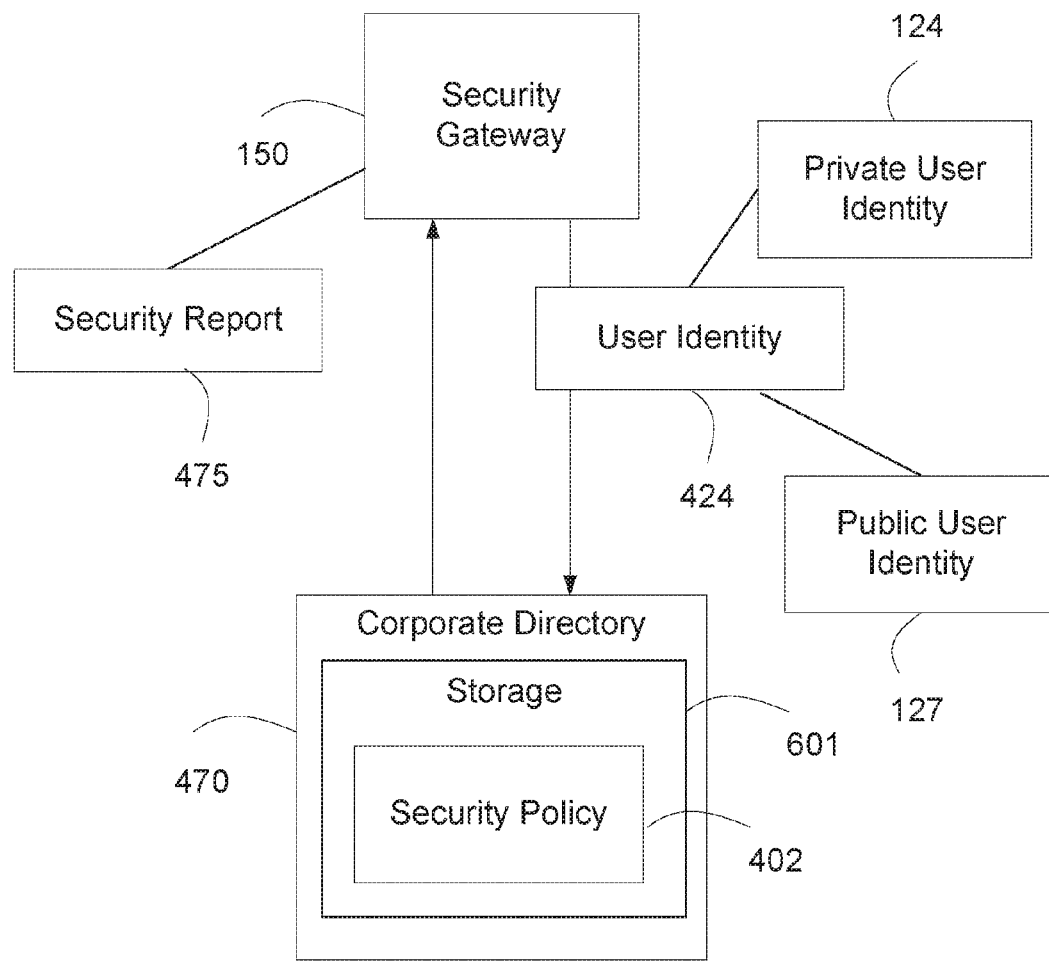
FIG. 6 illustrates an embodiment of a security gateway obtaining a security policy by querying a corporate directory according to an embodiment of the present invention.

By using the application session record, the private user identity 124 and the public user identity 127 for an application session 182 may be determined. In some embodiments as illustrated by FIG. 6, upon determining the pubic user identity and the private user identity, security gateway 150 obtains security policy 402 for the application session 182 by querying corporate directory 470. In an embodiment, corporate directory 470 comprises security policy 402. In some embodiments, corporate directory 470 is a server computer comprising a storage 601 that includes security policy 402. In some embodiments, corporate directory 470 is a database comprising security policy 402. In another embodiment, corporate directory 470 is a software module with program code stored on a computer readable medium (not shown) running in a computer. In some embodiments, corporate directory 470 resides in identity server 570. In some embodiments, corporate directory 470 uses directory technologies such as Microsoft Active Directory™, lightweight directory access protocol (LDAP) directory services, web services, directory services using Java™ technologies. In some embodiments, corporate directory 470 includes a policy server hosting security policy 402 and other policies.

Security gateway 150 queries corporate directory 470 for a security policy, where the query includes user identity 424. User identity 424 may include private user identity 124 or public user identity 127. Corporate directory 470 matches user identity 424 against security policy 402 and determines security policy 402 is applicable to user identity 424. In some embodiments security policy 402 maps network parameters to a user identity and there is a match between user identity 424 and the user identity in the security policy 402. In some embodiments, security policy 402 maps network parameters to a group identity (not shown) and user identity 424 is a member of the group identity. In response to finding the match between the user identity 424 and the user identity in the security policy 402, corporate directory 470 sends security policy 402 to security gateway 150.

In some embodiments, security gateway 150 generates security report 475 based on application session record 184 and security policy 402. In some embodiments, security gateway 150 generates security report 475 based on a pre-determined user identity or a list of pre-determined user identities. For example, the security report may be generated based on an input of user identity or identities. In some embodiments, security gateway 150 generates security report 475 based on a pre-defined schedule or when requested by an operator.

Figure 7:
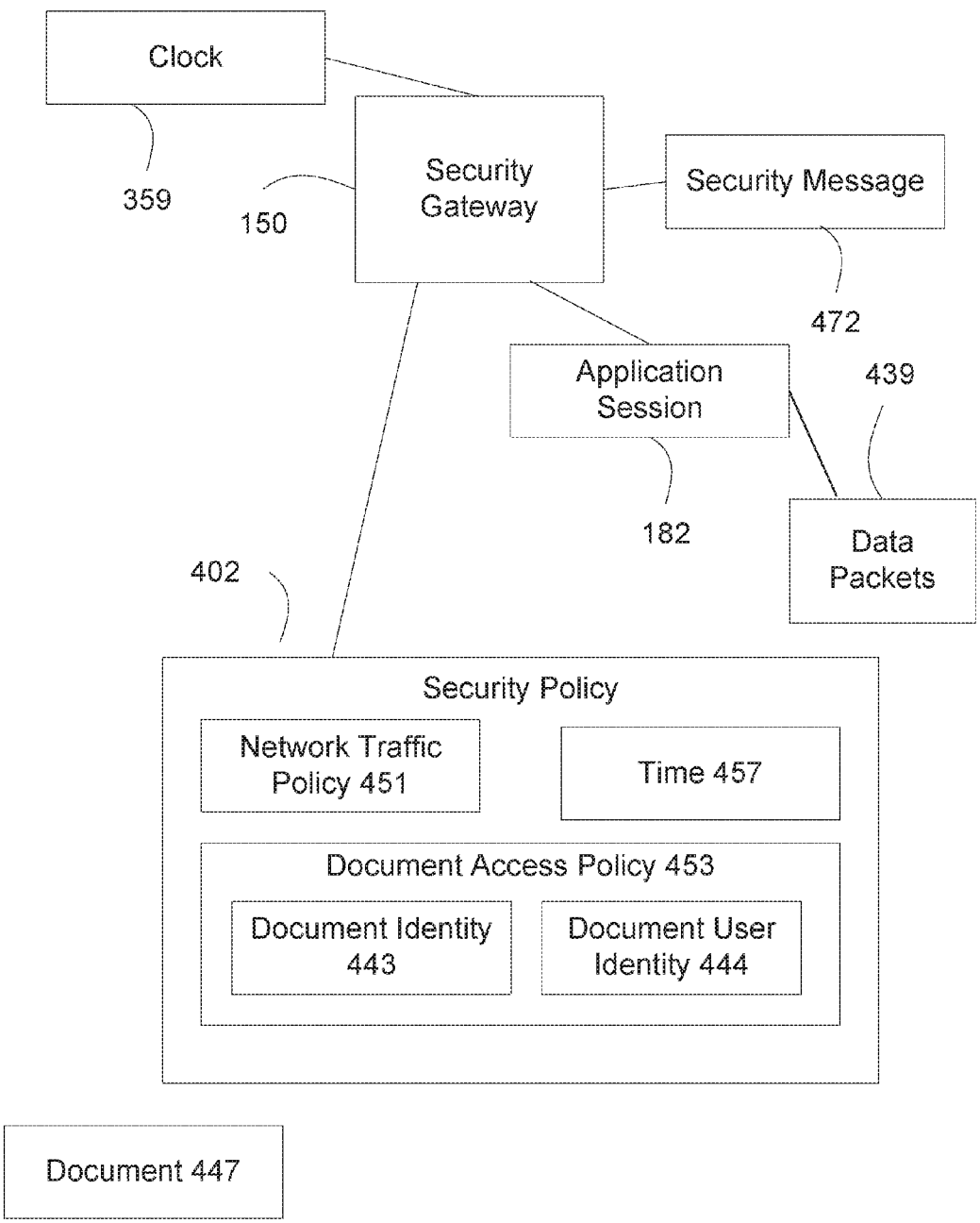
FIG. 7 illustrates a security policy including a security control according to an embodiment of the present invention.

In some embodiments, security policy 402 includes a security control function as illustrated in FIG. 7. Security gateway 150 applies the security policy 402 received from corporate directory 470 in response to the query to application session 182. Security policy 402 typically are configured by a company to protect against improper access to the company confidential documents and to protect against improper usage of the company secure network 160 vital for the company operation. In some embodiments, in response to receiving the security policy 402, the security gateway 150 confirms that the received security policy 402 contains a user identity that matches the user identity 424 sent in the query. In response to the confirmation, the security gateway 150 applies the security policy 402 to the application session 182. In FIG. 7, security policy 402 includes network traffic policy 451 or document access policy 453.

FIG. 8 illustrates a plurality of embodiments of network traffic policy 451 according to various embodiments of the present invention. In some embodiments, network traffic policy 451 specifies network based application session access control indicating if user identity 424 is denied or allowed to continue application session 182. If denied, security gateway 150 may stop forwarding data packets 439 of application session 182. In some embodiments, network traffic policy 451 specifies bandwidth rate capacity such as 1 Mbps, 100 MB per day, or 5 GB per month. In an embodiment, bandwidth rate capacity is measured in packets such as 100 packets per second, 10 thousand packets per day or 4 million packets per month. In some embodiments, network traffic policy 451 specifies a quality of service (QOS) mapped to user identity 424 for application session 182. For example, network traffic policy 451 indicates a change of Differentiated Services Code Point (DSCP) marking in the data packets 439 of application session 182. In some embodiments, network traffic policy 451 specifies a queuing delay, a queuing priority, a packet forwarding path, a link interface preference, a server load balancing preference, a packet routing policy, or other control to handle data packets 439 of application session 182.

In some embodiments, network traffic policy 451 includes a traffic shaping control. In one example, traffic shaping control specifies a TCP profile such as a change of window segment size, or a TCP window adjustment.

In some embodiments, network traffic policy 451 indicates session connection rate control based on user identity 424 specifying a rate or capacity such as 10 session connections per second, 35 concurrent sessions, 100 sessions during lunch hour, 500 sessions a day, 24 voice sessions a day, or 75 file transfer sessions an hour. In some embodiments, network traffic policy 451 may specify, when exceeding the rate or capacity, if application session 182 is denied or data packets 439 of application session 182 are dropped.

In some embodiments, network traffic policy 451 includes application session modification control mapped to user identity 424, specifying how data packets 439 of application session 182 are modified for the user with the user identity 424. In one example, application session modification control specifies security gateway 150 should perform network address translation (NAT) to application session 182 for user identity 424. In one example, security gateway 150 should perform port address translation (PAT) to application session 182 using a pre-determined port number for user identity 424. In another example, security gateway 150 should perform content substitution if application session 182 is an HTTP session and if a Universal Resource Locator (URL) in data packets 439 of application session 182 matches a pre-determined URL for user identity 424. In an example, security gateway 150 should perform filename substitution if application session 182 is a file transfer session and if a filename matching a pre-determined filename is found in data packets 439 of application session 182 for user identity 424. In another example, security gateway 150 should insert a cookie for user identity 424 if application session 182 is an HTTP session, with optionally data packets 439 matching a pre-determined POST or GET request of a URL.

Returning to FIG. 7, in some embodiments, document access policy 453 specifies if access to document 447 is allowed or denied. In some embodiments, document 447 includes a file, a business agreement, a contract, a spreadsheet, a presentation, a drawing, a textual document, a manual, a program, a piece of software program, a design, a product specification, a datasheet, a video file, an audio file, an email, a voice mail, a fax, a photocopy of a document, or any business document. In some embodiments, document 447 includes a URL leading to digital information such as database query result, a web page, a video, or a piece of music. In some embodiments, document 447 includes real time transfer or streaming of information such as video streaming, audio streaming, a webcast, a podcast, a video show, a teleconference session, or a phone call. In some embodiments, document access policy 453 includes document identity 443 and document user identity 444. Document identity 443 identifies document 447. Document user identity 444 identifies the user whose access to the document 447 is affected by the document access policy 453. In an embodiment, security gateway 150 compares user identity 424 with document user identity 444. In response to determining that the user identity 424 matches the document user identity 444, in some embodiments, security gateway 150 allows document 447 with document identity 443 to be accessed by user identity 424. In another embodiment, security gateway 150 denies access to document 447 with document identity 443. In denying access, the security gateway 150 may disconnect application session 182 or discard data packets 439. In some embodiments, security gateway 150 confirms that data packets 439 include document identity 443. In response to confirming that data packets 439 include document identity 443, security gateway 150 applies document access policy 453.

In some embodiments security policy 402 includes time 457 where security policy 402 is applicable within time 457. In some embodiments, time 457 indicates a beginning time such as 8 am, 4 pm, midnight. In an embodiment, time 457 indicates a time range such as 8 am to 10 am, 7 pm to 5 am, morning hours, lunch, rush hour, prime time. Security gateway 150 compares clock 359 with time 457 and determines if security policy 402 is applicable.

In some embodiments, security gateway 150 generates security message 472 when security gateway 150 determines if security policy 402 is applicable to application session 182 for user identity 424. In some embodiments, security gateway generates security message 472 when security gateway 150 applies security policy 402 to application session 182. In some embodiments, security report 475 includes security message 472. In one example, security message 472 includes security policy 402 and user identity 424. In one example, security message 472 includes the actions security gateway 150 applies to application session 182 using security policy 402.

Figure 9:
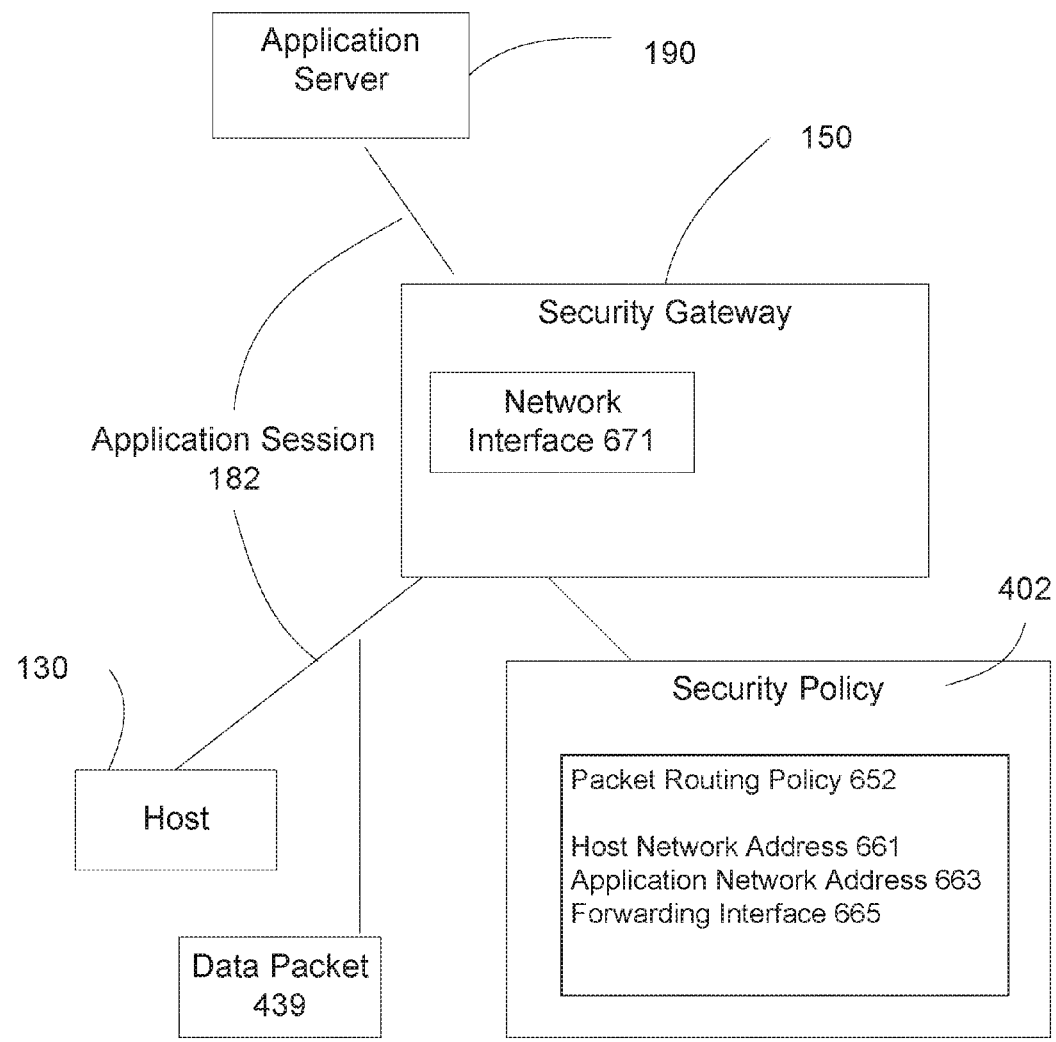
FIG. 9 illustrates a security policy that includes a packet routing policy according to an embodiment of the present invention.

FIG. 9 illustrates an embodiment where security policy 402 includes a packet routing policy 652 according to an embodiment of the present invention. Security gateway 150 is configured to receive and apply packet routing policy 652 of network traffic policy 451 to data packet 439 of application session 182. In some embodiments, packet routing policy 652 includes host network address 661, application network address 663 and forwarding interface 665. In some embodiments, host network address 661 includes IP address of host 130. In some embodiments, host network address 661 includes a transport layer identity such as TCP port number or UDP port number of application session 182. In some embodiments, application network address 663 includes IP address of application server 190. In some embodiments, application network address 663 includes a transport layer information such as TCP port number or UDP port number of application session 182.

Security gateway 150 applies packet routing policy 652 for data packet 439 of application session 182 by first comparing data packet 439 against packet routing policy 652. In some embodiments, security gateway 150 obtains source network address of data packet 439, which may include source IP address and source transport layer information. In some embodiments, security gateway 150 obtains destination network address of data packet 439, which may include destination IP address and destination transport layer information. Security gateway 150 compares source network address of data packet 439 against host network address 661, and in some embodiments, compares destination network address of data packet 439 against application network address 663. When there is match, security gateway 150 processes data packet 439 using forwarding interface 665. In some embodiments, security gateway 150 includes a network interface 671 and forwarding interface 665 indicates transmitting data packet 439 using network interface 671. In some embodiments, forwarding interface 665 indicates a modification to be applied to data packet 439 prior to transmission. In some embodiments, the modification indicated in forwarding interface 665 is to add a tunnel header, such as an IP-IP tunnel header, an L2TP tunnel header, an IPSec tunnel header, or a layer 2 tunnel header. Security gateway 150 applies the modification to data packet 439 and sends the modified data packet 439 to network interface 671.

Figure 10:
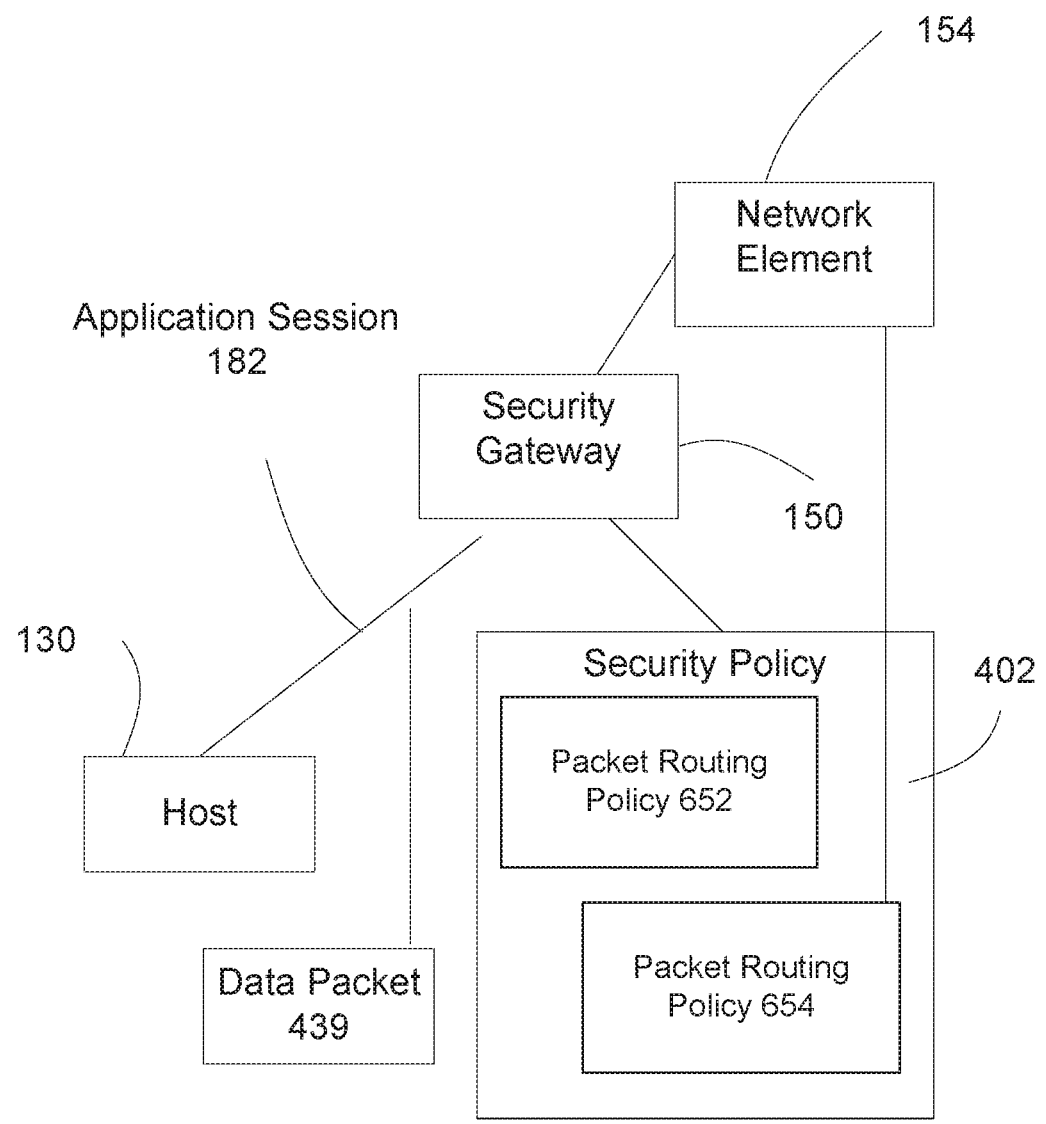
FIG. 10 illustrates a security gateway connected to a network element according to an embodiment of the present invention.

In some embodiments illustrated in FIG. 10, security gateway 150 connects to a network element 154. Embodiments of network element 154 includes functionality of a network switch such as an Ethernet switch, a router, a network gateway, a security gateway similar to security gateway 150, a firewall, and a border gateway. In some embodiments, security policy 402 includes packet routing policy 652 and packet routing policy 654. Packet routing policy 654 is associated with network element 154 and packet routing policy 652 is associated with security gateway 150. Security gateway 150 applies security policy 402 by first sending packet routing policy 654 to network element 154 such that network element 154 can apply packet routing policy 654. Security gateway 150 applies packet routing policy 652 to data packet 439 of application session 182 as illustrated in FIG. 9. In some embodiments, forwarding interface of packet routing policy 652 directs security gateway 150 to send data packet 439 or modified data packet 439 to network element 154.

In some embodiments, network element 154 receives data packet 439 or modified data packet 439 from security gateway 150. Network element 154 applies packet routing policy 654 to received data packet 439 in a similar manner as security gateway 150 applying packet routing policy 652 to data packet 439.

In some embodiments, packet routing policy 654 is associated with one or more additional network elements. Security gateway 150 sends packet routing policy 654 to the additional network elements.

In some embodiments, security gateway 150 applies packet routing policy 654 in conjunction with other attributes of network traffic policy 451.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by the Claims following.

What is claimed is:

1. A method for routing data packets of an application session, the method comprising:
   inspecting, by a security gateway, a data packet for an application session and storing a host identity and an application session time in an application session record;
   determining, by the security gateway, from the data packet for the application session a user identity and storing the user identity in the application session record;
   determining, by the security gateway, a second user identity by matching an access session record of an access session accessed during the application session that comprises the second user identity, a second host identity, and an access session time, wherein the second host identity and the access session time match the host identity and the application session time of the application session record;
   storing the second user identity in the application session record;
   determining, by the security gateway, at least one packet routing policy applicable to the application session, the at least one packet routing policy comprising a host network address, an application network address, and a forwarding interface;
   receiving, at the security gateway, a second data packet for the application session, the second data packet comprising a source network address and a destination network address;
   comparing, by the security gateway, the source network address from the second data packet with the host network address of the at least one packet routing policy, or comparing the destination network address from the second data packet with the application network address of the at least one packet routing policy; and
   in response to finding a match between the source network address from the second data packet and the host network address of the at least one packet routing policy, or a match between the destination network address from the second data packet and the application network address of the at least one packet routing policy, processing the second data packet using the forwarding interface of the at least one packet routing policy by the security gateway.

2. The method of claim 1, wherein the security gateway comprises a network interface, wherein the forwarding interface of the at least one packet routing policy indicates a modification to be applied to the second data packet, wherein the processing further comprises:
   in response to finding the match between the second data packet and the at least one packet routing policy, modifying the second data packet by the security gateway.

3. The method of claim 2, further comprising:
   transmitting the modified data packet using the network interface of the security gateway.

4. The method of claim 2, wherein the modifying the second data packet by the security gateway comprises adding a tunnel header to the second data packet.

5. The method of claim 4, wherein the tunnel header is one of: an IP-IP tunnel header, an L2TP tunnel header, an IPSec tunnel header, or a layer 2 tunnel header.

6. The method of claim 1, wherein the security gateway is coupled to a network element, wherein the forwarding interface of the at least one packet routing policy directs the security gateway to apply a modification to the second data packet and send the second data packet to the network element, wherein the processing further comprises:
   in response to finding the match between the second data packet and the at least one packet routing policy, modifying the second data packet by the security gateway.

7. The method of claim 6, further comprising:
   transmitting the modified data packet to the network element using a network interface of the security gateway.

8. The method of claim 6, wherein the modifying the second data packet by the security gateway comprises adding a tunnel header to the second data packet.

9. A system, comprising:
   a security gateway, wherein the security gateway:
      inspects a data packet for an application session and stores a host identity and an application session time in an application session record;
      determines from the data packet for the application session a user identity and stores the user identity in the application session record;
      determines a second user identity by matching an access session record of an access session accessed during the application session that comprises the second user identity, a second host identity, and an access session time, wherein the second host identity and the access session time match the host identity and the application session time of the application session record;
      stores the second user identity in the application session record;
      determines at least one packet routing policy applicable to the application session, the at least one packet routing policy comprising a host network address, an application network address, and a forwarding interface;

receives a second data packet for the application session, the second data packet comprising a source network address and a destination network address;

compares the source network address from the second data packet with the host network address of the at least one packet routing policy, or compares the destination network address from the second data packet with the application network address of the at least one packet routing policy; and in response to finding a match between the source network address from the second data packet and the host network address of the at least one packet routing policy, or a match between the destination network address from the second data packet and the application network address of the at least one packet routing policy, processes the second data packet using the forwarding interface of the at least one packet routing policy by the security gateway.

10. The system of claim 9, wherein the security gateway comprises a network interface, wherein the forwarding interface of the at least one packet routing policy indicates a modification to be applied to the second data packet, wherein in processing the second data packet, the security gateway:

in response to finding the match between the second data packet and the at least one packet routing policy, modifies the second data packet.

11. The system of claim 10, wherein in processing the second data packet, the security gateway further:

transmits the modified data packet using the network interface of the security gateway.

12. The system of claim 10, wherein in modifying the second data packet, the security gateway adds a tunnel header to the second data packet.

13. The system of claim 12, wherein the tunnel header is one of: an IP-IP tunnel header, an L2TP tunnel header, an IPSec tunnel header, or a layer 2 tunnel header.

14. The system of claim 9, further comprising a network element coupled to the security gateway, wherein the forwarding interface of the at least one packet routing policy directs the security gateway to apply a modification to the second data packet and send the second data packet to the network element, wherein in processing the second data packet, the security gateway:

in response to finding the match between the second data packet and the at least one packet routing policy, modifies the second data packet by the security gateway.

15. The system of claim 14, wherein in processing the second data packet, the security gateway further:

transmits the modified data packet to the network element using a network interface of the security gateway.

16. The system of claim 14, wherein in modifying the second data packet, the security gateway adds a tunnel header to the second data packet.

17. A non-transitory computer readable storage medium having computer readable program code embodied therewith for routing data packets of an application session, the computer readable program code configured to:

inspect, by a security gateway, a data packet for an application session and storing a host identity and an application session time in an application session record;

determine, by the security gateway, from the data packet for the application session a user identity and store the user identity in the application session record;

determine, by the security gateway, a second user identity by matching an access session record of an access session accessed during the application session that comprises the second user identity, a second host identity, and an access session time, wherein the second host identity and the access session time match the host identity and the application session time of the application session record;

store the second user identity in the application session record;

determine, by the security gateway, at least one packet routing policy applicable to the application session, the at least one packet routing policy comprising a host network address, an application network address, and a forwarding interface;

receive, at the security gateway, a second data packet for the application session, the second data packet comprising a source network address and a destination network address;

compare, by the security gateway, the source network address from the second data packet with the host network address of the at least one packet routing policy, or compare the destination network address from the second data packet with the application network address of the at least one packet routing policy; and in response to finding a match between the source network address from the second data packet and the host network address of the at least one packet routing policy, or a match between the destination network address from the second data packet and the application network address of the at least one packet routing policy, process the second data packet using the forwarding interface of the at least one packet routing policy by the security gateway.

18. The medium of claim 17, wherein the security gateway comprises a network interface, wherein the forwarding interface of the at least one packet routing policy indicates a modification to be applied to the second data packet, wherein the computer readable program code configured to process is further configured to:

in response to finding the match between the second data packet and the at least one packet routing policy, modify the second data packet by the security gateway.

19. The medium of claim 18, wherein the computer readable program code configured to process is further configured to:

transmit the modified data packet using the network interface of the security gateway.

20. The medium of claim 18, wherein the modification of the second data packet by the security gateway comprises adding a tunnel header to the second data packet.

21. The medium of claim 20, wherein the tunnel header is one of: an IP-IP tunnel header, an L2TP tunnel header, an IPSec tunnel header, or a layer 2 tunnel header.

22. The medium of claim 17, wherein the security gateway is coupled to a network element, wherein the forwarding interface of the at least one packet routing policy directs the security gateway to apply a modification to the second data packet and send the second data packet to the network element, wherein the computer readable program code configured to process is further configured to:

in response to finding the match between the second data packet and the at least one packet routing policy, modify the second data packet by the security gateway.

23. The medium of claim 22, wherein the computer readable program code configured to process is further configured to:

transmit the modified data packet to the network element using a network interface of the security gateway.

24. The medium of claim 22, wherein the modification of the second data packet by the security gateway comprises adding a tunnel header to the second data packet.

\* \* \* \* \*